(12) United States Patent
Sugimoto et al.

(10) Patent No.: US 7,275,526 B2
(45) Date of Patent: Oct. 2, 2007

(54) MULTI-CYLINDER ENGINE

(75) Inventors: Satoshi Sugimoto, Sakai (JP); Masahiro Aketa, Sakai (JP); Tetsuya Kosaka, Sakai (JP); Yukimasa Kabe, Sakai (JP); Shuichi Yamada, Sakai (JP)

(73) Assignee: Kubota Corporation, Osaka (JP)

( * ) Notice: Subject to any disclaimer, the term of this patent is extended or adjusted under 35 U.S.C. 154(b) by 31 days.

(21) Appl. No.: 11/370,324

(22) Filed: Mar. 8, 2006

(65) Prior Publication Data
US 2007/0068497 A1 Mar. 29, 2007

(30) Foreign Application Priority Data
Sep. 28, 2005 (JP) ............. P 2005-281753

(51) Int. Cl.
F02M 25/07 (2006.01)
F02M 35/10 (2006.01)
F02B 47/08 (2006.01)

(52) U.S. Cl. ............. 123/569.12; 123/184.21; 123/568.17

(58) Field of Classification Search ........ 123/184, 123/21, 184.24, 184.38, 184.42, 568.12, 123/568.13, 568.17, 568.18
See application file for complete search history.

(56) References Cited

U.S. PATENT DOCUMENTS 5,979,421 A * 11/1999 Yamashita et al. ..... 123/568.12
6,186,127 B1 * 2/2001 Everingham .......... 123/568.12
6,311,678 B1 * 11/2001 Lepoutre ............. 123/568.12
6,334,437 B1 * 1/2002 Jessberger ............ 123/568.12
6,971,378 B2 * 12/2005 Mackey et al. ........ 123/568.12
7,165,539 B2 * 1/2007 Menin et al. ......... 123/568.12
7,182,074 B1 * 2/2007 Redon et al. ......... 123/568.12
7,207,324 B2 * 4/2007 Kuhnel et al. ........ 123/568.12

FOREIGN PATENT DOCUMENTS

JP    2002-285917 A    10/2002
JP    2003074418 A *   3/2003  .......... 123/568.12

* cited by examiner

Primary Examiner—Willis R. Wolfe, Jr.
(74) Attorney, Agent, or Firm—Akin Gump Strauss Hauer & Feld LLP (57) ABSTRACT

The present invention provides a multi-cylinder engine capable of inhibiting an EGR cooler from being damaged and at the same time making the EGR cooler compact. On the assumption that a direction where a crank shaft spans is taken as a front and rear direction and a widthwise direction of a cylinder head perpendicular to this front and rear direction is deemed as a lateral direction, an intake-air distributing passage wall is attached to one lateral side surface of the cylinder head and an exhaust-gas converging passage wall ached to the other lateral side of the cylinder head, the exhaust-gas converging passage wall having an interior area communicated with an interior area of the intake-air distributing passage wall through the EGR cooler. In this multi-cylinder engine, an intake-air inlet pipe is made to stand up at an upper portion of the intake air distributing passage wall and the EGR cooler is above the intake-air distributing passage wall. Further, the intake-air inlet pipe is arranged side by side with the EGR cooler.

11 Claims, 6 Drawing Sheets

MULTI-CYLINDER ENGINE

BACKGROUND OF THE INVENTION

1. Technical Field

The present invention relates to a multi-cylinder engine and more particularly it concerns a multi-cylinder engine capable of inhibiting an EGR cooler from being damaged and at the same time making the EGR cooler compact.

2. Earlier Technology

There is a conventional example of this multi-cylinder engine which, on the assumption that a direction where a crank shaft spans is taken as a front and rear direction and that a widthwise direction of a cylinder head perpendicular to the front and rear direction is deemed as a lateral direction, comprises the cylinder head having one lateral side surface to which an intake-air distributing passage wall is attached and having the other lateral side to which an exhaust-gas converging passage wall is attached, the exhaust-air converging passage wall having an interior area communicated with an interior area of the intake-air distributing passage wall through an EGR cooler, as well as the present invention.

The multi-cylinder engine of this type has an advantage of being able to efficiently attempt to reduce NOx by lowering the temperature of EGR gas through the EGR cooler.

However, some of the conventional engines have EGR coolers each of which spans above the exhaust-gas converging passage wall (exhaust manifold) (for example, see Japanese Patent Public Disclosure No. 2000-8973). Therefore, it has caused problems.

The conventional engine has the following problems.

<Problem> The EGR Cooler is Readily Damaged.

The EGR cooler receives the heat radiated from the exhaust-gas converging passage wall to be overheated with the result of being damaged with ease.

<Problem> The EGR Cooler Becomes Larger.

Due to the fact that the EGR cooler receives the heat radiated from the exhaust-gas converging passage wall, it is required to enhance its cooling ability so as to remove the heat. This results in enlarging the EGR cooler.

SUMMARY OF THE INVENTION

The present invention has an object to provide a multi-cylinder engine capable of solving the above-mentioned problems, namely a multi-cylinder engine able to inhibit the EGR cooler from being damaged and at the same time to make it compact.

The characteristic matter of the invention as set forth in claim 1 is as follows.

Figure 2:
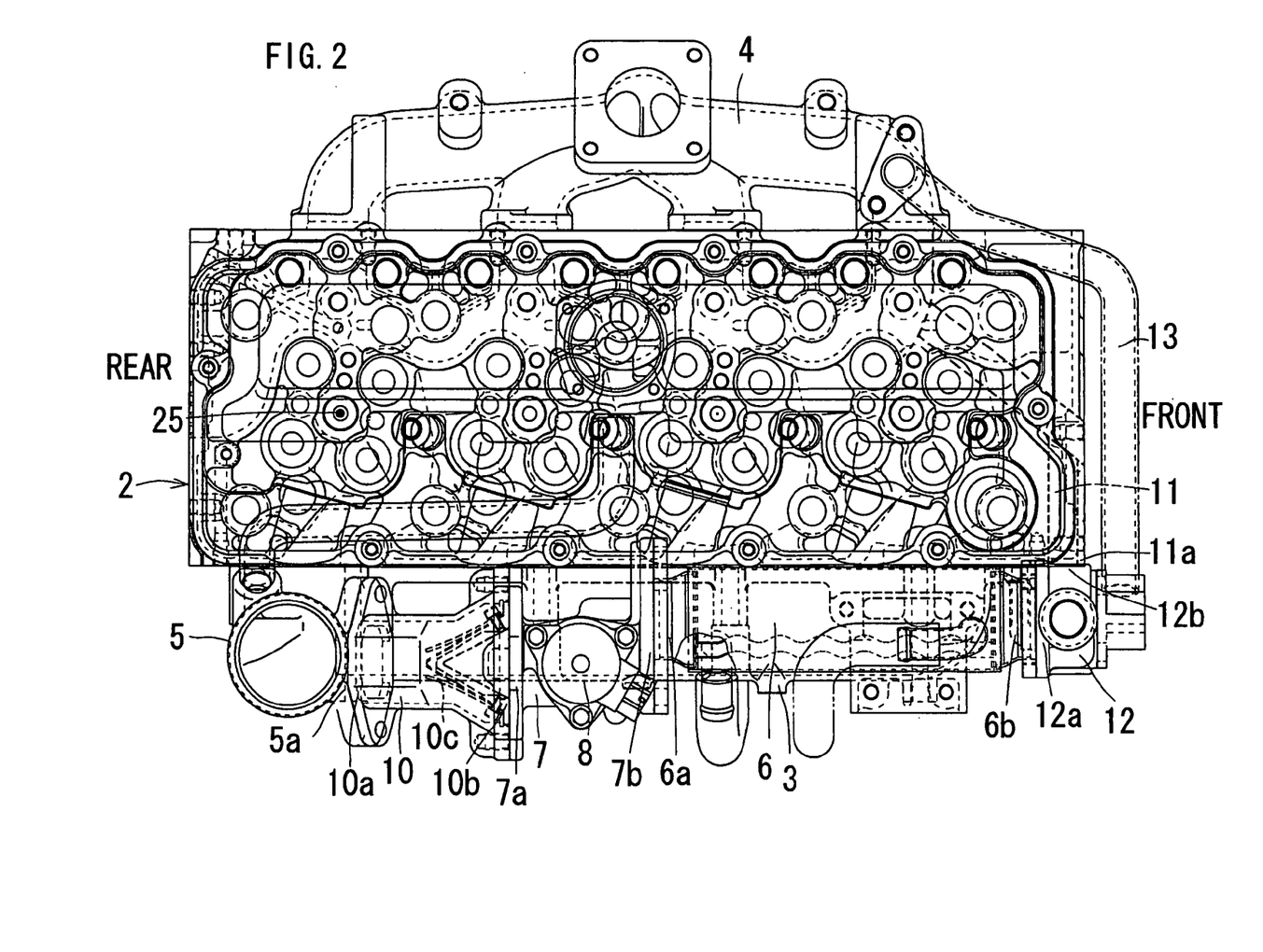
FIG. 2 is a plan view of a cylinder head and its surroundings of the engine according to the embodiment of the present invention.

As exemplified in FIG. 2, on the assumption that a direction where a crank shaft 1 spans is taken as a front and rear direction and that a widthwise direction of a cylinder head 2 perpendicular to the front and rear direction is deemed as a lateral direction, a multi-cylinder engine comprises the cylinder head 2 having one lateral side surface to which an intake-air distributing passage wall 3 is attached and having the other lateral side to which an exhaust-gas converging passage wall 4 is attached, the exhaust-gas converging passage wall 4 having an interior area communicated with an interior area of the intake-air distributing passage wall 3 through an EGR cooler.

Figure 1:
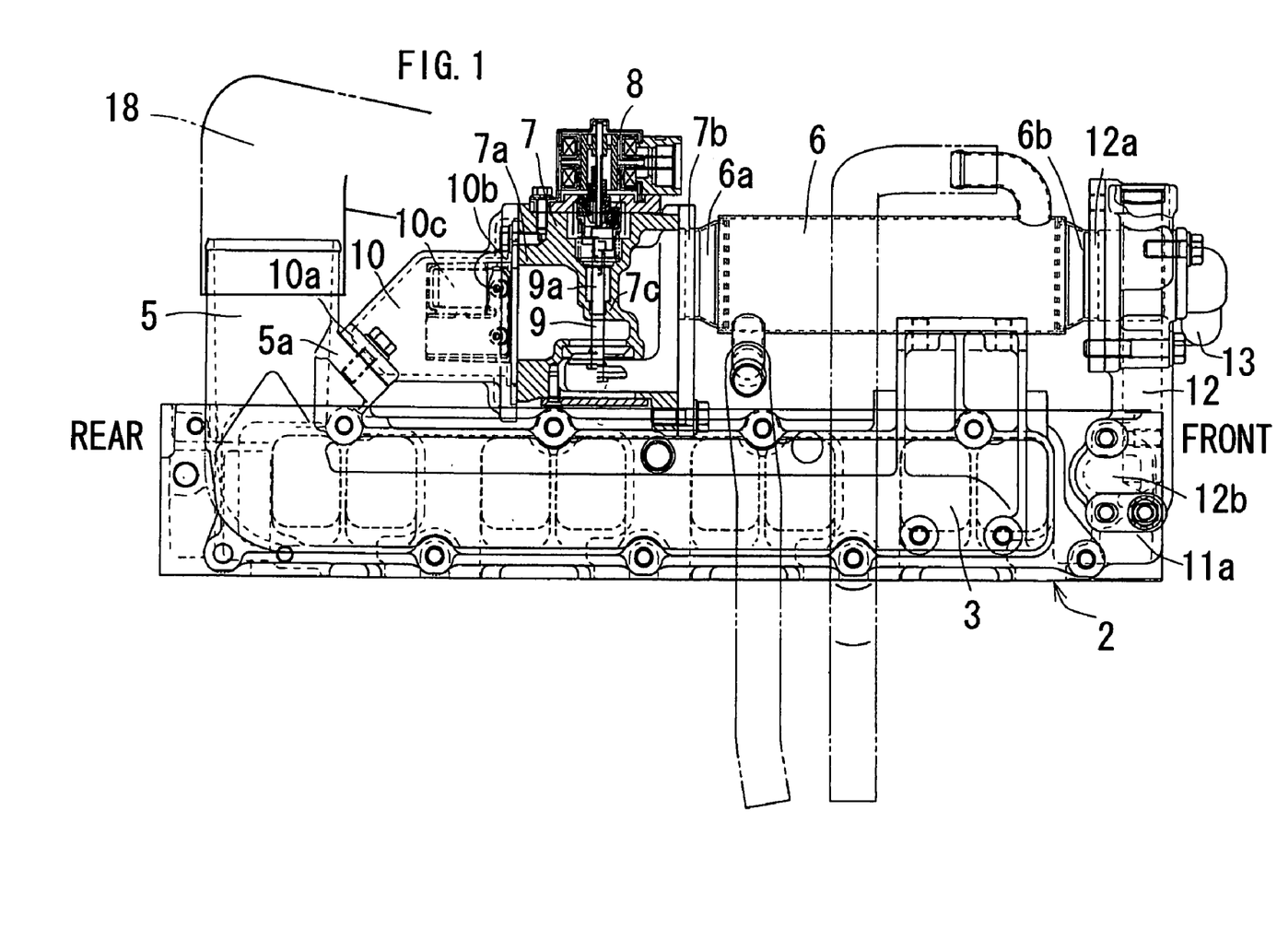
FIG. 1 is a left side view of an intake-air distributing passage wall and its surroundings of an engine according to an embodiment of the present invention.

In this multi-cylinder engine, as shown in FIGS. 1 and 2, an intake-air inlet pipe 5 is made to stand up at an upper portion of the intake-air distributing passage wall 3 and the EGR cooler 6 spans in the front and rear direction above the intake-air distributing passage wall 3, the intake-air inlet pipe 5 being arranged side by side with the EGR cooler 6 in the front and rear direction.

(Invention of Claim 1)

<Effect> It is Possible to Prohibit the EGR Cooler from Being Damaged.

As exemplified in FIGS. 1 and 2, the EGR cooler 6 spans in the front and rear direction above the intake-air distributing passage wall 3. Consequently, there is no room for the EGR cooler 6 to receive the heat radiated from the exhaust-gas converging passage wall 4 with the result of being able to prohibit the EGR cooler 6 from being damaged by the overheat.

<Effect> It is Possible to Make the EGR Cooler Compact.

Owing to the fact that there is no room for the EGR cooler 6 to receive the heat radiated from the exhaust-gas converging passage wall 4 and therefore there is no need of increasing its cooling ability so as to remove the heat, the EGR cooler 6 can be made compact.

<Effect> It is Possible to Downsize the Engine.

As exemplified in FIGS. 1 and 2, the intake-air inlet pipe 5 is made to stand up at the upper portion of the intake-air distributing passage wall 3 and the EGR cooler 6 spans in the front and rear direction above the intake-air distributing passage wall 3. Further, the intake-air inlet pipe 5 is arranged side by side with the EGR cooler 6 in the front and rear direction. Thus a space above the intake-air distributing passage wall 3 which was originally a dead space can be effectively utilized as a space for arranging the EGR cooler 6 to result in the possibility of downsizing the engine.

(Invention of Claim 2)

It offers the following effect in addition to those of the invention as set forth in claim 1.

<Effect> It is Possible to Inhibit an EGR Valve from Being Damaged.

As shown in FIG. 1, an EGR valve case 7 is positioned downstream of the EGR cooler 6. Therefore, the EGR gas cooled by the EGR cooler 6 flows into the EGR valve case 7. This makes it possible to inhibit an EGR valve 9 from being damaged by the overheat.

<Effect> It is Possible to Prevent a Valve Actuator from Being Damaged.

As illustrated in FIG. 1, the EGR valve case 7 is positioned downstream of the EGR cooler 6. A valve actuator 8 is attached to the EGR valve case 7. Accordingly, the EGR gas cooled by the EGR cooler 6 flows into the EGR valve case 7, so that the valve actuator 8 attached to the EGR valve case 7 is hardly overheated. Thus it is possible to inhibit the valve actuator 8 from being damaged by the overheat.

<Effect> It is Possible to Downsize the Engine.

As exemplified in FIGS. 1 and 2, the EGR valve case 7 is disposed above the intake-air distributing passage wall 3. Further, the intake-air inlet pipe 5, the EGR valve case 7 and the EGR cooler 6 are arranged side by side with each other in the front and rear direction. The space above the intake-air distributing passage wall 3 which was originally a dead space can be effectively used as a space for arranging the EGR valve case 7 and the EGR cooler 6 with the result of being able to make the engine compact.

(Invention of Claim 3)

It offers the following effect in addition to those of the invention as set forth in claim 2.

<Effect> It is Possible to Inhibit the EGR Valve from Being Damaged.

As exemplified in FIG. 1, the EGR valve 9 has its axis 9a made to be vertical and be slidably and internally fitted into a valve-axis insertion hole 7c within the EGR valve case 7. Therefore, unlike the case where the EGR valve has its axis made horizontal, there is no probability that the valve axis of the EGR valve disadvantageously butts against the valve-axis insertion hole unilaterally by its own weight, which in turn leads to the possibility of prohibiting the EGR valve 9 from being damaged due to eccentric abrasion.

(Invention of Claim 4)

It offers the following effect in addition to those of the invention as set forth in claim 2.

<Effect> It is Possible to Prevent the EGR Valve from Being Damaged.

As exemplified in FIG. 1, a check valve 10c is made to inhibit the flow-in of the intake air from the intake-air inlet pipe 5 into the EGR valve case 7. This gets rid of the disadvantage that the EGR valve 9 is rapidly cooled by the flow-in of the intake air, which results in the possibility of inhibiting the EGR valve 9 from being damaged due to the rapid cooling.

<Effect> It is Possible to Attempt to Reduce NOx.

As shown in FIG. 1, the check valve 10c is made to inhibit the reverse flow of the EGR gas from the intake-air inlet pipe 5 into the EGR valve case 7. This can optimize the EGR rate in an attempt to efficiently reduce the NOx.

(Invention of Claim 5)

It offers the following effect in addition to those of the invention as set forth in claim 1.

<Effect> The EGR Cooler Can be Made Compact.

As exemplified in FIG. 2, the cylinder head 2 is provided with an in-head EGR passage 11 which passes through an interior area of a water-cooling jacket and the EGR cooler 6 is arranged downstream of this in-head EGR passage 11. Thus the EGR gas can be cooled by the in-head EGR passage, which in turn can lower the cooling ability of the EGR cooler 6 by an amount corresponding to the decrease of heat obtained owing to this cooling. Thus it is possible to make the EGR cooler 6 compact.

<Effect> It is Possible to Attempt to Reduce the NOx.

The EGR gas can be cooled by the in-head EGR passage 11, which in turn can decrease the temperature of the EGR gas by an amount corresponding to the decrease of heat obtained owing to this cooling. Therefore, it is possible to efficiently attempt to reduce the NOx.

(Invention of claim 6)

It offers the following effect in addition to those of the invention as set forth in claim 5.

<Effect> It is Possible to Inhibit the EGR Cooler from Being Damaged.

As exemplified in FIGS. 1 and 2, the intake-air inlet pipe 5, the EGR valve case 7, the EGR cooler 6 and a connection pipe 12 are arranged in the mentioned order from the rear side to the front side. In consequence, even if a part, a tool or the like substance approaches the EGR cooler 6 from the rear side when producing the engine or making the maintenance thereof, this substance can be received by to the intake-air inlet pipe 5 and an intake-air supply pipe 18 connected to the intake-air inlet pipe 5 before the substance collides against the EGR cooler 6 from the rear side. This makes it possible to prevent the EGR cooler 6 from being damaged by the substance which collides thereagainst from the rear side. Further, similarly, even if the substance approaches from the front side, the connection pipe 12 can receive this substance before this substance collides against the EGR cooler 6 from the front side. Thus it is possible to prohibit the EGR cooler 6 from being damaged by the collision of the substance from the front side.

(Invention of Claim 7)

It offers the following effect in addition to that of the invention as set forth in claim 6.

<Effect> It is Possible to Smoothly Conduct the Assembling Work of Parts on an Assembling-line of the Engine.

As shown in FIGS. 1 and 2, the EGR valve case 7, the EGR cooler 6 and the connection pipe 12 are made as constituents of a rigid connected body and these constituents form a non-flexible rigid connected body. Accordingly, it is possible to assemble a plurality of parts at one time as an integral rigid connected body on the assembling-line of the engine by preliminarily connecting the constituents of this rigid connected body outside the assembling-line of the engine, which entails the possibility of smoothly carrying out the assembling work of parts on the assembling-line of the engine.

<Effect> The Rigid Connected Body can be Handled Easily.

Since the rigid connected boy has no flexibility, it does not deform when it is carried into the assembling-line of the engine or it is assembled on the assembling-line of the engine and therefore is treated easily.

(Invention of Claim 8)

It offers the following effect in addition to those of the invention as set forth in claim 7.

<Effect> It is Possible to Inhibit the EGR Valve from Being Damaged.

As shown in FIG. 1, the check valve 10c is made to inhibit the flow-in of the intake air and the reverse flow of the EGR gas from the intake-air inlet pipe 5 into the EGR valve case 7. This removes the disadvantage that the EGR valve 9 is rapidly cooled by the flow-in of the intake air, which entails the possibility of inhibiting the EGR valve 9 from being damaged by the rapid cooling.

<Effect> It is Possible to Attempt to Reduce the NOx.

As exemplified in FIG. 1, the check valve 10c is made to inhibit the reverse flow of the EGR gas from the intake-air inlet pipe 5 into the EGR valve case 7. This optimizes the EGR rate to result in the possibility of attempting to efficiently reduce the NOx.

(Invention of Claim 9)

It offers the following effect in addition to those of the invention as set forth in claim 5.

<Effect> It is Possible to Attempt to Reduce the NOx.

As exemplified in FIG. 2, both of the in-head EGR passage 11 and an exo-head passage 13 are arranged to introduce the EGR gas into the EGR cooler 6 to result in being able to secure a high EGR rate. Thus it is possible to efficiently attempt to reduce the NOx.

(Invention of Claim 10)

It offers the following effect in addition to that of the invention as set forth in claim 9.

<Effect> It is Possible to Make the EGR Cooler Compact.

Figure 3:
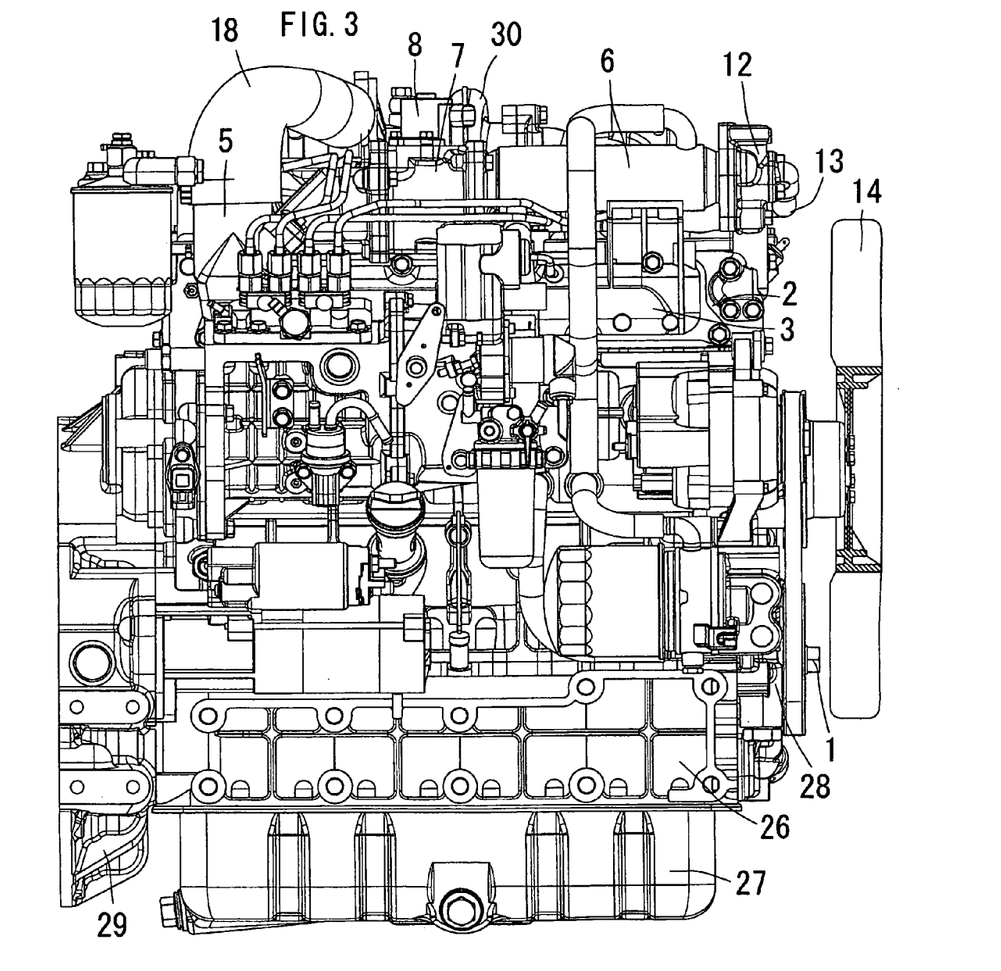
FIG. 3 is a left side view of the engine according to the embodiment of the present invention.
Figure 4:
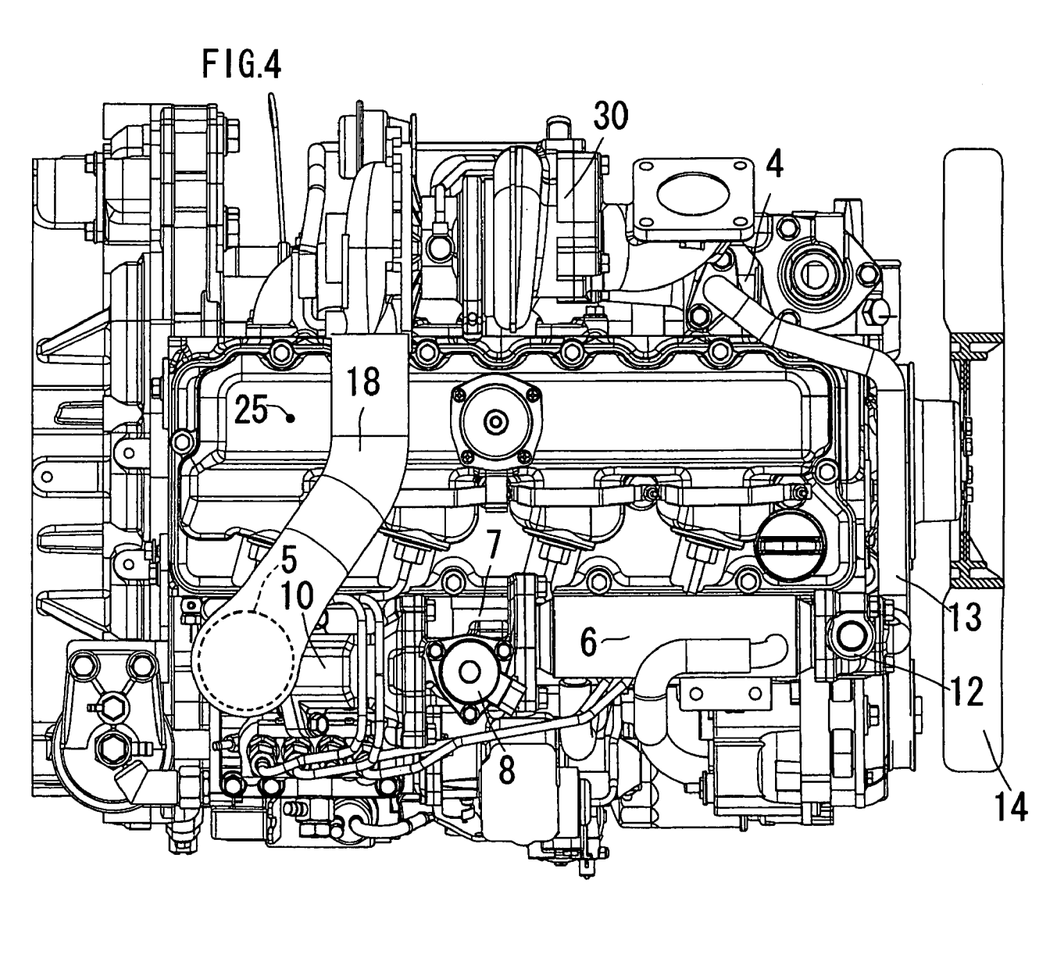
FIG. 4 is a plan view of the engine according to the embodiment of the present invention.
Figure 5:
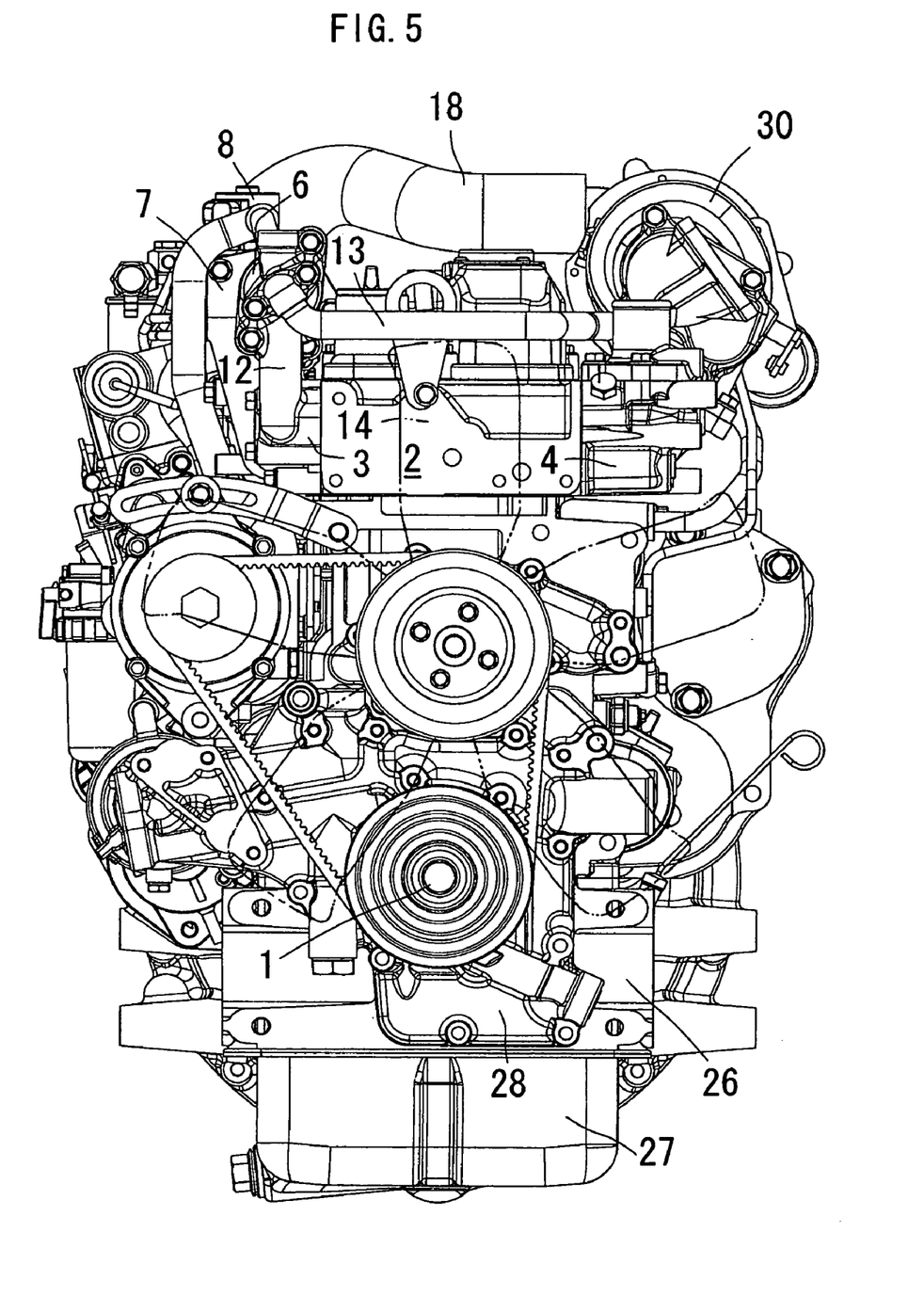
FIG. 5 is a front view of the engine according to the embodiment of the present invention.

As shown in FIGS. 3 to 5, an engine-cooling air produced by an engine-cooling fan 14 is adapted to blow against the exo-head EGR passage 13. Therefore, it is possible to lower the cooling ability of the EGR cooler 6 by an amount corresponding to the decrease of heat obtained by this cooling with the result of being able to make the EGR cooler compact.

<Effect> It is Possible to Attempt to Reduce the NOx.

The EGR gas can be cooled by the exo-head EGR passage 13. Consequently, it is possible to lower the temperature of the EGR gas by an amount corresponding to the decrease of heat obtained by this cooling with the result of being able to attempt to efficiently reduce the NOx.

(Invention of Claim 11)

It offers the following effect in addition to those of the invention as set forth in claim 1.

<Effect> It is Possible to Attempt to Reduce the NOx.

Figure 6A:
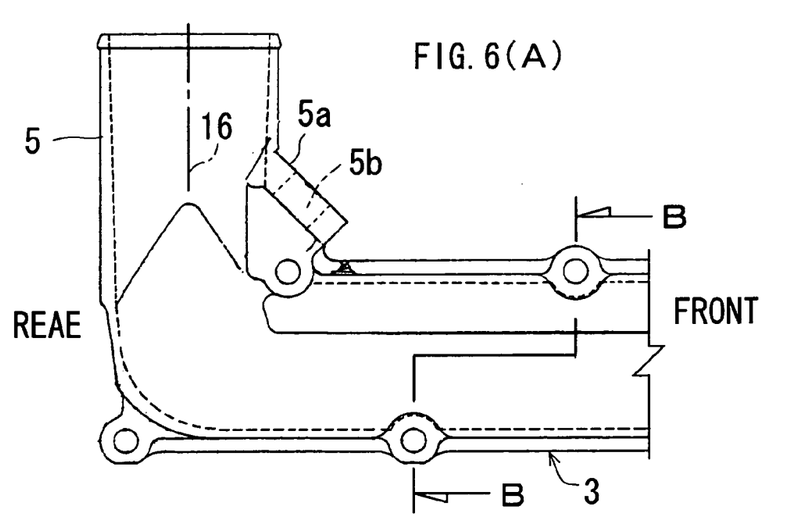
FIGS. 6(A), 6(B) and 6(C) are a left side view of a rear portion, a sectional view taken along a line B-B in FIG. 6(A) and a plan view of the rear portion.
Figures 6B, 6C:
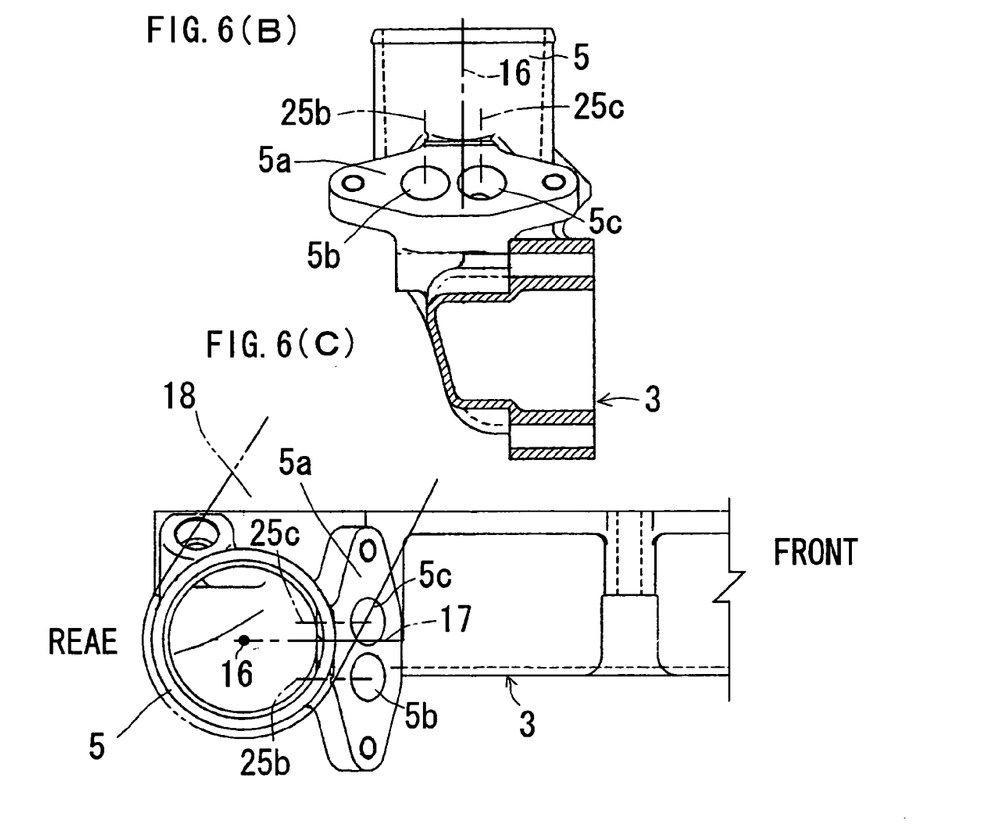

As exemplified in FIG. 6, a laterally elongated EGR-gas inlet portion 5a is drilled to form a pair of left and right EGR-gas inlet holes 5b and 5c. Therefore, when compared with the case where a single EGR-gas inlet hole is formed through drilling the EGR-gas inlet passage 5a, it is possible to increase the total area of the EGR-gas inlet without enlarging the diameter of the EGR-gas inlet to result in the possibility of securing a high EGR rate in an attempt to reduce the NOx. Further, the EGR-gas inlet hole 5b positioned far away from the cylinder head 2 at an external side portion thereof has a center axis 25b is arranged to go further away from an imaginary line 17 extending in the front and rear direction than a center axis 25c of the EGR-gas inlet hole 5c positioned close to the cylinder head 2 at an internal side portion thereof. The intake-air supply pipe 18 which is connected to the intake-air inlet pipe 5 is made to approach the intake-air inlet pipe 5 from the side of the cylinder head 2. Thus the EGR gas is distributed uniformly to every cylinder with the result of being able to attempt to efficiently reduce the NOx. The considered reason why this can be done is probably because the EGR gas which has flowed from the EGR-gas inlet hole 5b at the external side portion, into an external side portion of the intake-air inlet pipe 5 is involved into a high-speed intake air current caused at the external side portion of the intake-air inlet pipe 5 to result in improving the mixture of the EGR gas with the intake air.

BRIEF DESCRIPTION OF THE DRAWINGS

FIG. 6 is an explanatory view of the intake-air distributing passage wall to be employed in the engine according to the embodiment of the present invention.

DETAILED DESCRIPTION OF THE PREFERRED EMBODIMENT

An embodiment of the present invention is explained with reference to the drawings. FIGS. 1 to 6 show a multi-cylinder engine according to the embodiment of the present invention. In this embodiment, an explanation is given for a vertical water-cooled multi-cylinder diesel engine.

The Embodiment of the Present Invention is Outlined as Follows.

As shown in FIG. 3, a cylinder head 2 is assembled to an upper portion of a cylinder block 26. An oil pan 27 is assembled to a lower portion of the cylinder block 26. A gear case 28 is assembled to a front portion of the cylinder block 26. A fly-wheel housing 29 is assembled to a rear portion of the cylinder block 26.

An EGR Device is Constructed as Follows.

As shown in FIG. 2, on the assumption that a direction where a crank shaft 1 spans is taken as a front and rear direction and that a widthwise direction of the cylinder head 2 perpendicular to this front and rear direction is deemed as a lateral direction, an intake-air distributing passage wall 3 is attached to a left lateral side surface of the cylinder head 2 and an exhaust-gas converging passage wall 4 is attached to a right lateral side of the cylinder head 2. The exhaust-gas converging passage wall 4 has an interior area communicated with an interior area of the intake-air distributing passage wall 3 through an EGR cooler 6. Although the intake-air distributing passage wall 3 serves as an intake manifold, as shown in FIG. 1, it is formed in the shape of a box without any branched pipe. Therefore, such a part's name is used. The exhaust-gas converging passage wall 4 serves as an exhaust manifold, but such a part's name is employed in correspondence with the part's name of the intake-distributing passage wall 3.

The EGR Device is Devised as Follows.

As shown in FIGS. 1 and 2, an intake-air inlet pipe 5 is made to stand up at an upper portion of the intake-air distributing passage wall 3 and the EGR cooler 6 spans in the front and rear direction above the intake-air distributing passage wall 3. The intake-air inlet pipe 5 is arranged side by side with the EGR cooler 6 in the front and rear direction. The EGR cooler 6 is arranged at a position just above the intake-air distributing passage wall 3, which is above the intake-air distributing passage wall 3 and overlaps the same as shown in FIG. 2, when seen in a direction parallel to a cylinder center axis 25. The EGR cooler 6 is disposed so as not to project outwards laterally (away from the cylinder head) of the intake-air distributing passage wall 3 when seen in the direction parallel to the cylinder center axis 25. Cooling water is introduced from a water-cooling jacket within the cylinder block 26 into the EGR cooler 6 and is guided out to a cooling-water pump (not shown).

As illustrated in FIG. 1, an EGR valve case 7 is disposed above the intake-air distributing passage wall 3. The intake-air inlet pipe 5, the EGR valve case 7 and the EGR cooler 6 are arranged side by side with each other in the front and rear direction. The EGR valve case 7 is positioned downstream of the EGR cooler 6 and a valve actuator 8 is attached to the EGR valve case 7. A pulse motor is employed for the valve actuator 8. The EGR valve case 7 is arranged at a position just above the intake-air distributing passage wall 3, which is above the intake-air distributing passage wall 3 and overlaps the same when seen in the direction parallel to the cylinder center axis 25 as shown in FIG. 2. As illustrated in FIG. 1, an EGR valve 9 formed from a poppet valve has its axis 9a made to be vertical and be slidably and internally fitted into a valve-axis insertion hole 7c within the EGR valve case 7.

As shown in FIGS. 1 and 2, a check valve case 10 is arranged between the EGR valve case 7 and the intake-air inlet pipe 5. A check valve 10c disposed within this check valve case 10 can inhibit the flow-in of the intake air and the reverse flow of the EGR gas from the intake-air inlet pipe 5 into the EGR valve case 7. The cylinder head 2 is provided with an in-head EGR passage 11 which passes through an interior area of the water-cooling jacket and the EGR cooler 6 is arranged downstream of this in-head EGR passage 11.

As shown in FIG. 3, one side of the front and rear direction, on which an engine-cooling fan 14 is disposed, is taken as a front side and the opposite side is deemed as a rear side. The intake-air inlet pipe 5, the EGR valve case 7, the EGR cooler 6 and a connection pipe 12 are arranged in the mentioned order from the rear side to the front side. As illustrated in FIGS. 1 and 2, an EGR-gas inlet portion 5a at a front portion of a peripheral wall of the intake-air inlet pipe 5 is communicated with an EGR-valve case outlet portion 7a at a rear portion of the EGR valve case 7. A cooler-outlet portion 6a at a rear end of the EGR cooler 6 is attached to an EGR-valve case inlet portion 7b at a front portion of the EGR valve case 7 and is communicated therewith. A connection-pipe outlet portion 12a at an upper portion of a rear surface of the connection pipe 12 is attached to a cooler-inlet portion 6b at a front end of the EGR cooler 6 and is communicated therewith. A connection-pipe inlet portion 12b at a lower portion of a lateral surface of the connection pipe 12 is attached to an in-head EGR passage outlet portion 11a at a front portion of a lateral surface of the cylinder head 2 and is communicated therewith.

The EGR valve case 7, the EGR cooler 6 and the connection pipe 12 are manufactured as constituents of a rigid connected body. These constituents form a non-flexible rigid connected body. Further, the check valve case 10 is manufactured as one of the constituents of the rigid connected body. A check-valve case inlet portion 10b at a front portion of the check valve case 10 is attached to the EGR-valve case outlet portion 7a at the rear portion of the EGR valve case 7 and is communicated therewith. A check-valve outlet portion 10a at a rear surface of the check valve case 10 is attached to the EGR-gas inlet portion 5a at the front portion of the peripheral wall of the intake-air inlet pipe 5 and is communicated therewith. A check valve 10c disposed within the check valve case 10 can inhibit the flow-in of the intake air and the reverse flow of the EGR gas from the intake-air inlet pipe 5 into the EGR valve case 7.

As shown in FIGS. 1 and 2, an exo-head EGR passage 13 is conducted out from the interior area of the exhaust-gas converging passage wall 4 to pass through an exterior area of the cylinder head 2 and the EGR cooler 6 is arranged downstream of this exo-head EGR passage 13. Thus the EGR gas is introduced into the EGR cooler 6 from both of the in-head EGR passage 11 and the exo-head EGR passage 13.

As shown in FIGS. 3 to 5, the exo-head EGR passage 13 is disposed at the back of the engine-cooling fan 14 so that the engine-cooling air produced by the engine-cooling fan 14 can blow against the exo-head EGR passage 13. As illustrated in FIG. 5, when seen in a direction parallel to the direction where the crank shaft 1 spans, although the exo-head EGR passage 13 is slightly shifted from a position where it overlaps the cooling fan 14, since a region against which the engine-cooling air blows spreads over a locus of an outer periphery of the engine-cooling fan 14, the engine-cooling air blows against the exo-head EGR passage 13.

As shown in FIG. 6, the intake-air inlet pipe 5 is provided at the front portion of its peripheral wall with a laterally elongated EGR-gas inlet portion 5a. This EGR-gas inlet portion 5a is drilled to form a pair of left and right EGR-gas inlet holes 5b and 5c. When seen in a direction parallel to a center axis 16 of the intake-air inlet pipe 5, center axes 25b and 25c of the respective EGR-gas inlet holes 5b and 5c are positioned on the left and right sides of an imaginary line 17 extending in the front and rear direction, which passes over the center axis 16 of the intake-air inlet pipe 5. The center axis 25b of the EGR-gas inlet hole 5b positioned far away from the cylinder head 2 at an external side portion thereof is made to go further away from the imaginary line 17 extending in the front and rear direction, than the center axis 25c of the EGR-gas inlet hole 5c positioned close to the cylinder head 2 at an internal side portion thereof. The intake-air supply pipe 18, which is connected to the intake-air inlet pipe 5, approaches the intake-air inlet pipe 5 from the side of the cylinder head 2. As shown in FIGS. 3 to 5, the intake-air supply pipe 18 is conducted out of a supercharger 30 attached at an upper portion of the exhaust-gas converging passage wall 4.

What is claimed is:

1. A multi-cylinder engine, on the assumption that a direction where a crank shaft (1) spans is taken as a front and rear direction and that a widthwise direction of a cylinder head (2) perpendicular to this front and rear direction is deemed as a lateral direction, which comprises an intake-air distributing passage wall (3) attached to one lateral side surface of the cylinder head (2) and an exhaust-gas converging passage wall (4) attached to the other lateral side of the cylinder head (2), the exhaust-gas converging passage wall (4) having an interior area communicated with an interior area of the intake-air distributing passage wall (3) through an EGR cooler (6), wherein an intake-air inlet pipe (5) is made to stand up at an upper portion of the intake-air distributing passage wall (3) and the EGR cooler (6) spans above the intake-air distributing passage wall (3) in the front and rear direction, the intake-air inlet pipe (5) being arranged side by side with the EGR cooler (6) in the front and rear direction.

2. The multi-cylinder engine as set forth in claim 1, wherein an EGR valve case (7) is disposed above the intake-air distributing passage wall (3), the intake-air inlet pipe (5), the EGR valve case (7) and the EGR cooler (6) being arranged side by side with each other in the front and rear direction, and the EGR valve case (7) is positioned downstream of the EGR cooler 6, a valve actuator (8) being attached to the EGR valve case (7).

3. The multi-cylinder engine as set forth in claim 2, wherein an EGR valve (9) has its axis (9a) made to be vertical and be slidably and internally fitted into a valve-axis insertion hole (7c) of the EGR valve case (7).

4. The multi-cylinder engine as set forth in claim 2, wherein a check valve case (10) is arranged between the EGR valve case (7) and the intake-air inlet pipe (5), and a check valve (10) disposed within this check valve case (10) inhibits the flow-in of intake air and the reverse flow of EGR gas from the intake-air inlet pipe (5) into the EGR valve case (7).

5. The multi-cylinder engine as set forth in claim 1, wherein the cylinder head (2) is provided with an in-head EGR passage (11) which passes through an interior area of a water-cooling jacket and the EGR cooler (6) is arranged downstream of this in-head EGR passage (11).

6. The multi-cylinder engine as set forth in claim 5, wherein on the assumption that one optional side of the front and rear direction is taken as a front side and the other side thereof is deemed as a rear side, the intake-air inlet pipe (5), the EGR valve case (7), the EGR cooler (6) and a connection pipe (12) are arranged from the rear side to the front side in the mentioned order, and an EGR-valve case outlet portion (7a) at a rear portion of the EGR valve case (7) is communicated with an EGR-gas inlet portion (5a) at a front portion of a peripheral wall of the intake-air inlet pipe (5), a cooler-outlet portion (6a) at a rear end of the EGR cooler (6) being attached to an EGR-valve case inlet portion (7b) at a front portion of the EGR valve case 7 and communicated therewith, a connection-pipe outlet portion (12a) at an upper portion of a rear surface of the connection pipe (12) being attached to a cooler-inlet portion (6b) at a front end of the EGR cooler (6) and communicated therewith, a connection-pipe inlet portion (12b) at a lower portion of a lateral surface of the connection pipe (12) being attached to an in-head EGR passage outlet portion (11a) at a front portion of a lateral surface of the cylinder head (2) and communicated therewith.

7. The multi-cylinder engine as set forth in claim 6, wherein the EGR valve case (7), the EGR cooler (6) and the connection pipe (12) are made as constituents of a rigid connected body and these constituents form a non-flexible rigid connected body.

8. The multi-cylinder engine as set forth in claim 7, wherein a check valve case (10) is also made as one of the constituents of the rigid connected body, and a check-valve case inlet portion (10b) at a front portion of the check valve case (10) is attached to the EGR-valve case outlet portion (7a) at the rear portion of the EGR valve case (7) and communicated therewith, a check-valve case outlet portion (10a) on a rear surface of the check valve case (10) being attached to an EGR-gas inlet portion (5a) at a front portion of a peripheral wall of the intake-air inlet pipe (5) and communicated therewith, a check valve (10c) disposed within the check valve case (10) being able to inhibit the flow-in of intake air and the reverse flow of EGR gas from the intake-air inlet pipe (5) into the EGR valve case (7).

9. The multi-cylinder engine as set forth in claim 5, wherein an exo-head EGR passage (13) is conducted out form the interior area of the exhaust-gas converging passage wall (4) to pass through an exterior area of the cylinder head (2) and the EGR cooler (6) is arranged downstream of this exo-head EGR passage (13), both of the in-head EGR passage (11) and the exo-head EGR passage (13) introducing the EGR gas into the EGR cooler (6).

10. The multi-cylinder engine as set forth in claim 9, wherein on the assumption that one side of the front and rear direction where an engine-cooling fan (14) is disposed is taken as a front side and the opposite side is deemed as a rear side, the exo-head EGR passage (13) is arranged at the back of the engine-cooling fan (14) and engine-cooling air produced by the engine-cooling fan (14) blows against this exo-head EGR passage (13).

11. The multi-cylinder engine as set forth in claim 1, wherein on the assumption that one optional side of the front and rear direction is taken as a front side, a laterally elongated EGR-gas inlet portion (5a) is provided at a front portion of a peripheral wall of the intake-air inlet pipe (5) and is drilled to form a pair of left and right EGR-gas inlet holes (5b) and (5c) and when seen in a direction parallel to a center axis (16) of the intake-air inlet pipe (5), center axes (25b) and (25c) of the respective EGR-gas inlet holes (5b) and (5c) are positioned on the left and right sides of an imaginary line (17) extending in the front and rear direction, which passes over the center axis 16 of the intake-air inlet pipe (5), the center axis (25b) of the EGR-gas inlet hole (5b) positioned far away from the cylinder head (2) at an external side portion thereof being made to go further away from the imaginary line (17) extending in the front and rear direction than the center axis (25c) of the EGR-gas inlet hole (5c) positioned close to the cylinder head (2) at an internal side portion thereof, an intake-air supply pipe (18), which is connected to the intake-air inlet pipe (5), approaching the intake-air inlet pipe (5) from the side of the cylinder head (2).

* * * * *